United States Patent
Bedekar et al.

(10) Patent No.: US 8,144,687 B2
(45) Date of Patent: Mar. 27, 2012

(54) METHOD, APPARATUS AND SYSTEM FOR ESTABLISHING A DIRECT ROUTE BETWEEN AGENTS OF A SENDER NODE AND A RECEIVER NODE

(75) Inventors: Anand S. Bedekar, Arlington Heights, IL (US); Rajeev Agrawal, Northbrook, IL (US); Venkat Gopikanth, Buffalo Grove, IL (US); Suresh Kalyanasundaram, Bangalore, IN (US); Vishnu Ram OV, Trivandrum, IN (US)

(73) Assignee: Motorola Mobility, Inc., Libertyville, IL (US)

( * ) Notice: Subject to any disclaimer, the term of this patent is extended or adjusted under 35 U.S.C. 154(b) by 394 days.

(21) Appl. No.: 11/913,935

(22) PCT Filed: Jun. 19, 2006

(86) PCT No.: PCT/US2006/023731
§ 371 (c)(1),
(2), (4) Date: Nov. 9, 2007

(87) PCT Pub. No.: WO2007/001953
PCT Pub. Date: Jan. 4, 2007

(65) Prior Publication Data
US 2008/0186964 A1    Aug. 7, 2008

(30) Foreign Application Priority Data
Jun. 21, 2005    (IN) .............................. 536/KOL/2005

(51) Int. Cl.
*H04L 12/28* (2006.01)

(52) U.S. Cl. ......................................... 370/351; 370/392
(58) Field of Classification Search .................. None
See application file for complete search history.

(56) References Cited

U.S. PATENT DOCUMENTS

| | | | |
|---|---|---|---|
| 5,506,838 A * | 4/1996 | Flanagan | ...................... 370/258 |
| 6,195,555 B1 | 2/2001 | Dent | |
| 6,230,012 B1 | 5/2001 | Willkie et al. | |
| 6,285,880 B1 | 9/2001 | Gagnon et al. | |
| 6,430,698 B1 | 8/2002 | Khalil et al. | |
| 6,473,413 B1 | 10/2002 | Chiou et al. | |
| 6,567,664 B1 | 5/2003 | Bergenwall et al. | |
| 6,711,408 B1 | 3/2004 | Raith | |
| 6,721,565 B1 | 4/2004 | Ejzak et al. | |
| 6,795,857 B1 | 9/2004 | Leung et al. | |

(Continued)

FOREIGN PATENT DOCUMENTS
EP    0777396 A1    6/1997
(Continued)

OTHER PUBLICATIONS

Wikipedia Article from Internet: "Global System for Mobile Communications", Apr. 17, 2005, http://web.archive.org/web/20050417021658/http://de.wikipedia.org/wiki/Global_System_for_Mobile_Communications, Mar. 27, 2008, pp. 1-13.

(Continued)

*Primary Examiner* — Phirin Sam

(57) ABSTRACT

In the present technique of a communication system (100), an address of a forwarding agent (114) linked to a receiver node (112) is detected to provide a discovered address. The discovered address is then used to establish a direct route with the forwarding agent of the receiver node for subsequent communications between a sender node (104) and the receiver node.

12 Claims, 6 Drawing Sheets

U.S. PATENT DOCUMENTS

| | | |
|---|---|---|
| 6,795,891 B2 | 9/2004 | Lin |
| 6,859,653 B1 | 2/2005 | Ayoub et al. |
| 6,977,938 B2 | 12/2005 | Alriksson et al. |
| 7,016,682 B2 | 3/2006 | Won et al. |
| 7,096,273 B1 | 8/2006 | Meier |
| 7,139,833 B2 | 11/2006 | Heller |
| 7,289,463 B2 | 10/2007 | Ozugur |
| 7,336,670 B1 | 2/2008 | Calhoun et al. |
| 7,349,380 B2 | 3/2008 | Barker, Jr. et al. |
| 7,450,544 B2 | 11/2008 | Rue |
| 7,486,670 B2* | 2/2009 | Kinoshita et al. ............ 370/389 |
| 7,512,687 B2 | 3/2009 | Jung |
| 7,606,194 B2* | 10/2009 | He ................. 370/329 |
| 7,649,866 B2 | 1/2010 | Chari et al. |
| 7,733,829 B2 | 6/2010 | Lee et al. |
| 7,860,067 B2 | 12/2010 | Na et al. |
| 2001/0024443 A1* | 9/2001 | Alriksson et al. ............. 370/401 |
| 2002/0015396 A1 | 2/2002 | Jung |
| 2002/0034166 A1 | 3/2002 | Barany et al. |
| 2002/0057657 A1 | 5/2002 | LaPorta et al. |
| 2002/0075844 A1 | 6/2002 | Hagen |
| 2002/0094813 A1 | 7/2002 | Koshimizu et al. |
| 2003/0016655 A1* | 1/2003 | Gwon ........................... 370/352 |
| 2003/0018810 A1* | 1/2003 | Karagiannis et al. ......... 709/238 |
| 2003/0076837 A1 | 4/2003 | Whitehill et al. |
| 2003/0104813 A1 | 6/2003 | Julka et al. |
| 2003/0148777 A1 | 8/2003 | Watanabe et al. |
| 2003/0174709 A1* | 9/2003 | Shankar .................. 370/395.31 |
| 2003/0202505 A1 | 10/2003 | Ozugur |
| 2003/0235176 A1 | 12/2003 | Zhang et al. |
| 2004/0005884 A1 | 1/2004 | Nieminen et al. |
| 2004/0022212 A1 | 2/2004 | Chowdhury et al. |
| 2004/0023653 A1* | 2/2004 | O'Neill ...................... 455/432.1 |
| 2004/0034705 A1* | 2/2004 | Focsaneanu ................ 709/225 |
| 2004/0043791 A1 | 3/2004 | Reddy |
| 2004/0063455 A1 | 4/2004 | Eran et al. |
| 2004/0066760 A1 | 4/2004 | Thubert et al. |
| 2004/0071109 A1 | 4/2004 | Herle et al. |
| 2004/0082330 A1 | 4/2004 | Marin |
| 2004/0114559 A1 | 6/2004 | Wang |
| 2004/0133684 A1 | 7/2004 | Chan et al. |
| 2004/0185852 A1 | 9/2004 | Son et al. |
| 2004/0213181 A1 | 10/2004 | Grech et al. |
| 2004/0213260 A1 | 10/2004 | Leung et al. |
| 2004/0242233 A1 | 12/2004 | Lutgen |
| 2005/0047399 A1 | 3/2005 | Lee et al. |
| 2005/0088994 A1 | 4/2005 | Maenpaa et al. |
| 2005/0113091 A1 | 5/2005 | Rodriguez et al. |
| 2005/0122946 A1 | 6/2005 | Won |
| 2005/0128975 A1 | 6/2005 | Kobayashi et al. |
| 2005/0135422 A1 | 6/2005 | Yeh |
| 2005/0148368 A1 | 7/2005 | Scheinert et al. |
| 2005/0163080 A1 | 7/2005 | Suh et al. |
| 2005/0180372 A1 | 8/2005 | Cho et al. |
| 2005/0185632 A1* | 8/2005 | Draves et al. ................. 370/351 |
| 2005/0213546 A1 | 9/2005 | Reitter et al. |
| 2006/0104247 A1* | 5/2006 | Dommety et al. ............ 370/338 |
| 2006/0112183 A1 | 5/2006 | Corson et al. |
| 2006/0142034 A1* | 6/2006 | Wentink et al. ............... 455/515 |

FOREIGN PATENT DOCUMENTS

| | | |
|---|---|---|
| EP | 1404143 A2 | 3/2004 |
| EP | 1263182 B1 | 12/2008 |
| WO | 00/45560 | 8/2000 |
| WO | 03049377 A1 | 6/2003 |
| WO | 2004/073324 A2 | 8/2004 |
| WO | 2004/073325 A2 | 8/2004 |

OTHER PUBLICATIONS

Chuah, M.C. et al.: Mobile Virtual Private Dial-up Services:, Bell Labs Technical Journal; Bell Laboratories; U.S., vol. 4, No. 3, Jul. 1999, pp. 51-72.

Perkins, Charles et al.: "IMHP: A Mobile Host Protocol for the Internet", in Proceedings of INET'94/JENC5, (1994), all pages.

Wu, Chun-Hsin et al.: "Bi-direction Route Optimization in Mobile IP over Wireless LAN", Vehicular Technology Conference, 2002, Proceedings. VTC 2002—Fall, 2002 IEEE 56th, all pages.

Perkins, C.: "IP Mobility Support for IPv4", Network Working Group, Request for Comments: 3344, Nokia Research Center, Aug. 2002, all pages.

R. Caceres and V.N. Padmanbhan: "Fast and Scalable Wireless Handoffs in Support of Mobile Internet Audio", ACM J. Mobile Net. and Appl., v3, No. 4, Dec. 1998, all pages.

Gustafsson Eva et al.: "Mobile IPv4 Regional Registration", draft-ietf-mobileip-reg-tunnel-09.txt, Mobile IP Working Group Internet Draft, Jun. 25, 2004, all pages.

Ericsson, "low Latency Handoffs in Mobile IPv4", Network Working Group, Internet-Draft, Expires Dec. 2004, Jun. 2004, draft-ieff-mobileip-lowlatency-handoffs-v4-09.txt, all pages.

Soliman, Hesham et al.: Hierarchical Mobile IPv6 Mobility management (HMIPv6), draft-ietf-mipshop-hmipv6-03.txt, Network Working Group, Expires: Apr. 2005, Oct. 2004, all pages.

Kempf, James et al.: "Post-handover Mobile Initiated Tunneling for Fast Mobile IPv4 Handover", draft-kempf-mobileip-postmit-handover-00.txt, Expires: Jun. 2002, all pages.

Fathi, Hanane et al.: "Mobility Management for VoIP in 3G Systems: Evaluation of Low-Latency Handoff Schemes", IEEE Wireless Communications, Apr. 2005, 1536-1284/05, pp. 96-104.

Perkins, C: "IP Mobility Support", Network Working Group, Request for Comments: 2002 IBM, Oct. 1996, all pages.

Translation of the Official Communication from the German Patent and Trademark Office date Aug. 19, 2011, all pages.

* cited by examiner

METHOD, APPARATUS AND SYSTEM FOR ESTABLISHING A DIRECT ROUTE BETWEEN AGENTS OF A SENDER NODE AND A RECEIVER NODE

RELATED APPLICATIONS

This application relates to the following patent applications as were filed on even date herewith (wherein the contents of such patent applications are incorporated herein by this reference):

METHOD AND APPARATUS TO FACILITATE COMMUNICATIONS USING SURROGATE AND CARE-OF INTERNET PROTOCOL ADDRESSES, U.S. patent application Ser. No. 11/913,939, filed on Nov. 9, 2007, and which application claims priority from PCT International Publication No. WO 2007/001948 and Indian patent application no. 537/KOL/2005, filed Jun. 21, 2005;

ADDRESS RESOLUTION PROTOCOL-BASED WIRELESS ACCESS POINT METHOD AND APPARATUS, U.S. patent application Ser. No. 11/913,940, filed on Nov. 9, 2007, and which application claims priority from PCT International Publication No. WO 2007/001949 and Indian patent application no. 538/KOL/2005, filed Jun. 21, 2005;

METHOD AND APPARATUS TO FACILITATE MOBILE STATION COMMUNICATIONS USING INTERNET PROTOCOL-BASED COMMUNICATIONS, U.S. patent application Ser. No. 11/913,944, filed on Nov. 9, 2007, and which application claims priority from PCT International Publication No. WO 2007/001954 and Indian patent application no. 539/KOL/2005, filed Jun. 21, 2005;

SYSTEM AND METHOD FOR PROVIDING A DISTRIBUTED VIRTUAL MOBILITY AGENT, U.S. patent application Ser. No. 11/913,937, filed on Nov. 9, 2007, and which application claims priority from PCT International Publication No. WO 2007/001951 and Indian patent application no. 534/KOL/2005, filed Jun. 21, 2005;

SYSTEM AND METHOD FOR PAGING AND LOCATION UPDATE IN A NETWORK, U.S. patent application Ser. No. 11/913,942, filed on Nov. 9, 2007, and which application claims priority from PCT International Publication No. WO 2007/001950 and Indian patent application no. 535/KOL/2005, filed Jun. 21, 2005;

METHOD AND APPARATUS FOR REDUCING LATENCY DURING WIRELESS CONNECTIVITY CHANGES, U.S. patent application Ser. No. 11/913,936, filed on Nov. 9, 2007, and which application claims priority from PCT International Publication No. WO 2007/001952 and Indian patent application no. 533/KOL/2005, filed Jun. 21, 2005.

TECHNICAL FIELD

This invention relates generally to methods for establishing a direct route between agents of a sender node and a receiver node.

BACKGROUND

In a general cellular communications system, communications between two mobile nodes are routed through multiple agents. Each of the mobile nodes is typically connected to a forwarding agent. As an example, a mobile node 1 ("MN1") typically uses a forwarding agent 1 ("FA1") to have data forwarded to it from the mobile node 1's home agent 1 ("HA1"). Similarly, a mobile node 2 ("MN2") uses another forwarding agent 2 ("FA2") to have data forwarded to it from its home agent 2 ("HA2"). Thus, if mobile node 1 or forwarding agent 1 knows only the home address of mobile node 2, the data have to go through mobile node 2's home agent 2. Specifically, when mobile node 1 wants to communicate with mobile node 2, data from mobile node 1 is forwarded to forwarding agent 1, then to home agent 2, then to forwarding agent 2, and finally to mobile node 2 (i.e., MN1 to FA1 to HA2 to FA2 to MN2). Alternatively, using reverse tunneling for the data sent by mobile node 1, a route is created from mobile node 1, to forwarding agent 1, to home agent 1, to home agent 2, to forwarding agent 2, and mobile node 2 (i.e., MN1 to FA1 to HA1 to HA2 to FA2 to MN2). The multiple forwarding events between mobile node 1 and mobile node 2 is an inefficient routing of packets because network resources are being unnecessarily wasted and longer end-to-end delays are being created.

BRIEF DESCRIPTION OF THE DRAWINGS

The above needs are at least partially met through provision of the direct route technique described in the following detailed description, particularly when studied in conjunction with the drawings, wherein.

Figure 1:
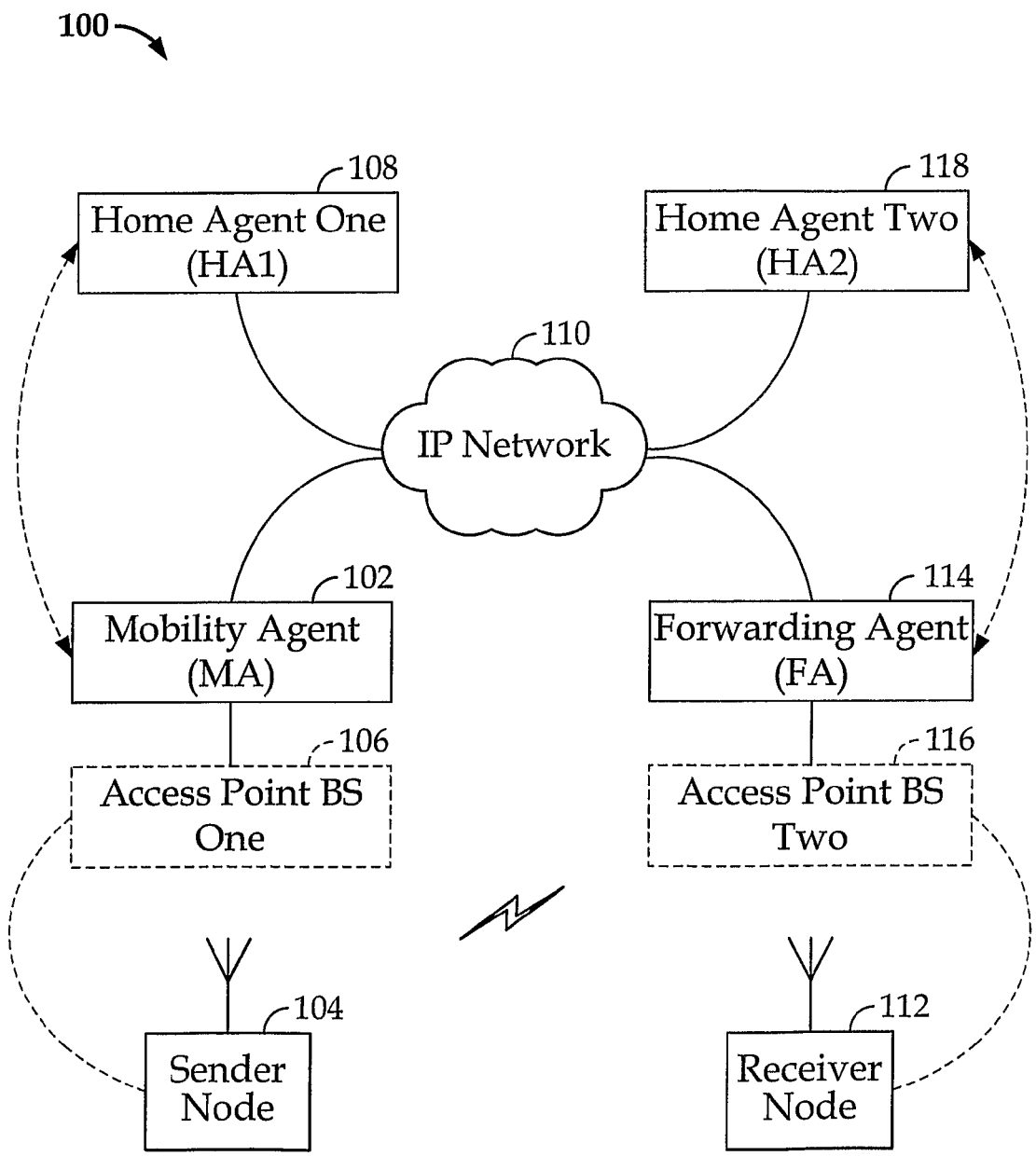
FIG. 1 comprises a wireless communications system suitable for various embodiments of the invention.

Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments of the present invention. Also, common and well-understood elements that are useful or necessary in a commercially feasible embodiment are often not depicted in order to facilitate a less obstructed view of these various embodiments of the present invention.

DETAILED DESCRIPTION

Generally speaking, pursuant to these various embodiments, an address of a forwarding agent linked to a receiver node is detected to provide a discovered address, which is used to establish a direct route with the forwarding agent of the receiver node for subsequent communications between a sender node and the receiver node. According to one embodiment, a determination is made as to whether communication with the forwarding agent should be terminated based on a predefined condition, and if so, the direct route with the forwarding agent is accordingly terminated, which invokes an exchange of a termination notice for providing notice of the termination of the direct route. In an embodiment, the predefined condition may be a disconnection of the sender node or the receiver node.

According to an embodiment, the discovered address is an Internet Protocol address. According to an embodiment, a discovery packet having a route tracking option is sent to the receiver node to detect the discovered address. Specifically, an address that identifies a route of the discovery packet is added to the route tracking option. In one embodiment, the discovery packet is an Internet Control Message Protocol ("ICMP") Echo packet having an Internet Protocol record route option, which uses an address of the sender node as a source address and an address of the receiver node as a destination address. Following this ICMP Echo packet, an Internet Protocol address of the forwarding agent is detected from an ICMP Echo Reply packet having a plurality of addresses that were tracked by the Internet Protocol record route option. Further, according to an embodiment and prior to the establishment of the direct route with the forwarding agent using the discovered address, a notification message is first sent to the forwarding agent to indicate the use of the direct route, followed by a determination as to whether a response has been received directly from the forwarding agent. If so, the direct route with the forwarding agent is established.

According to various embodiments, an apparatus is also provided with an address detection circuit to detect the discovered address and a communication agent circuit to establish the direct route with the forwarding agent. In one embodiment, the address detection circuit sends the discovery packet having the route tracking option to the receiver node. In the embodiment with the ICMP Echo packet, the address detection circuit further detects the Internet Protocol address of the forwarding agent from the ICMP Echo Reply packet. The communication agent circuit, on the other hand, is in charge of determining whether the direct route should be terminated based on the predefined condition and terminating the direct route if that is the case, which may trigger an exchange of a termination notice for providing notice of the termination of the direct route. The communication agent circuit also, according to one embodiment, confirms whether the forwarding agent is in fact able to communicate on the direct route. Specifically, in one embodiment, the communication agent circuit sends a confirmation request to the forwarding agent, wherein the confirmation of the forwarding agent being able to communicate on the direct route is established with a reply to the confirmation request from the forwarding agent.

According to various embodiments, a system has been provided that includes a plurality of nodes capable of wireless communication. A first mobility agent linked to a sender node from the plurality of nodes that is requesting communication with a receiver node is further included, wherein the mobility agent routes data packets for the sender node. A second mobility agent linked to the receiver node also routes data packets for the receiver node. The first mobility agent detects an address of the second mobility agent to provide a discovered address and establishes a direct route with the second mobility agent using the discovered address for subsequent communications between the sender node and the receiver node.

Through these various teachings, a technique is provided that establishes a direct route with agents that are substantially directly connected to the sender node and the receiver node for communications between the two nodes. As a result, an optimized route between the sender and receiver node is provided, since there is less forwarding needed on the communication route. Specifically, the home agents of the nodes are dropped from the route. From the use of this shorter route, less network resources will be used, thus creating a more efficient system. Moreover, less end-to-end delay also occurs between the sender and receiver node.

Because the route is optimized at the agent that is substantially directly connected to the mobile node and not the home agent, keeping track of various mobile-to-mobile connections is now easier, resulting in a more efficient load distribution. Moreover, the various embodiments provided can easily be implemented into the existing system without necessarily changing the home agent and mobile nodes. Thus, the integration of the various embodiments can be seamlessly implemented into an existing system, while at the same time providing for a less costly solution. Furthermore, the teachings described work even if the agent directly connected to either the sender or receiver node autonomously manages the setup and update of the path to the mobile node's home agent without any explicit request (such as a Mobile Internet Protocol registration request) from the mobile node. In fact, the various teachings provided can be used even when the mobile nodes are not Mobile-Internet Protocol capable.

Referring now to the drawings, and in particular to FIG. 1, for purposes of providing an illustrative but non-exhaustive example to facilitate this description, a specific operational paradigm using a wireless communication system is shown and indicated generally at 100. Those skilled in the art, however, will recognize and appreciate that the specifics of this illustrative example are not limiting with respect to the invention itself and that the teachings set forth herein are applicable in a variety of alternative settings. For example, since the teachings described are not platform dependent, they can be applied to various systems, such as, but not limited to, Code Division Multiple Access (CDMA) systems, Time Division Multiple Access (TDMA) systems, Universal Mobile Telecommunications Systems ("UMTSs"), General Packet Radio Service ("GPRS") systems, Internet Protocol ("IP") based systems, and non-cellular network systems. Each of these named systems may include any subsystems. For example, the IP based systems may include, but not limited to, an IP version 4 ("IPv4") or IP version 6 ("IPv6")-based communication systems. As such, any communication networks that include the feature of an agent for communication with a mobile node are contemplated and are within the scope of the invention.

Referring now to the exemplary wireless communication system 100 shown in FIG. 1, a mobility agent ("MA") 102 is substantially directly connected to a sender node ("SN") 104 via an access point base station one 106. As typically done, the mobility agent 102 is connected to a home agent one ("HA1") 108 of the sender node 104 via an IP network 110. In the system as shown, the sender node 104 is attempting to communicate with a receiver node 112, which is also substantially directly connected to a forwarding agent 114 via an access point base station two 116. The forwarding agent 114 is also connected to a home agent two ("HA2") 118 of the receiver node 112 via the IP network 110.

From the various teachings provided, communications between the sender node 104 and the receiver node 112 are effectuated through a direct route between the mobility agent 102 and the forwarding agent 114 via the IP network 110. Thus, the routing to the HA1 and HA2 108, 118 are deleted from the route, except for the first data packet from the mobility agent 102 to detect an address of the forwarding agent 114 for establishing the direct route. This optimized direct route will provide a more efficient use of the network resources and a reduction of end-to-end delay between the sender and receiver node 104, 112. For clarification, the mobility agent 102 is herein referred to as an agent implemented with some or all of the teachings of the various embodiments provided.

Note, however, that it is not necessary for the receiver node 112 to be connected to a mobility agent, although it is preferred. Since the various teachings can be easily integrated into an existing communication system, the forwarding agent 114 can be any type of agent on the system that either can or cannot communicate on the direct route via the IP network. Thus, the forwarding agent 114 can be a mobility agent and/or an existing foreign agent with or without IP based capacity. To emphasis this point, the forwarding agent is herein used to refer to any type of agent linked to the receiver node, which includes a mobility agent, a foreign agent, an existing agent, and the like.

As shown, numerous different implementations of the system 100 are possible through the various teachings provided, and other implementations using all or part of any components in the system, although not specifically shown, are contemplated and thus are within the scope of the invention. Moreover, because current cell phones have many similar functions to that of computer devices, the single term "mobile node," "sender node," or "receiver node" will be used to describe the various devices that can work with other multiple networks, such as the Internet. Specifically, mobile node, sender node, and/or receiver node will be used to refer to any mobile device, which may include, but is not limited to, a desktop computer, a laptop computer, a personal digital assistant, and/or a cell phone, that uses a specific network, such as a cellular network, for access to other networks.

Figure 2:
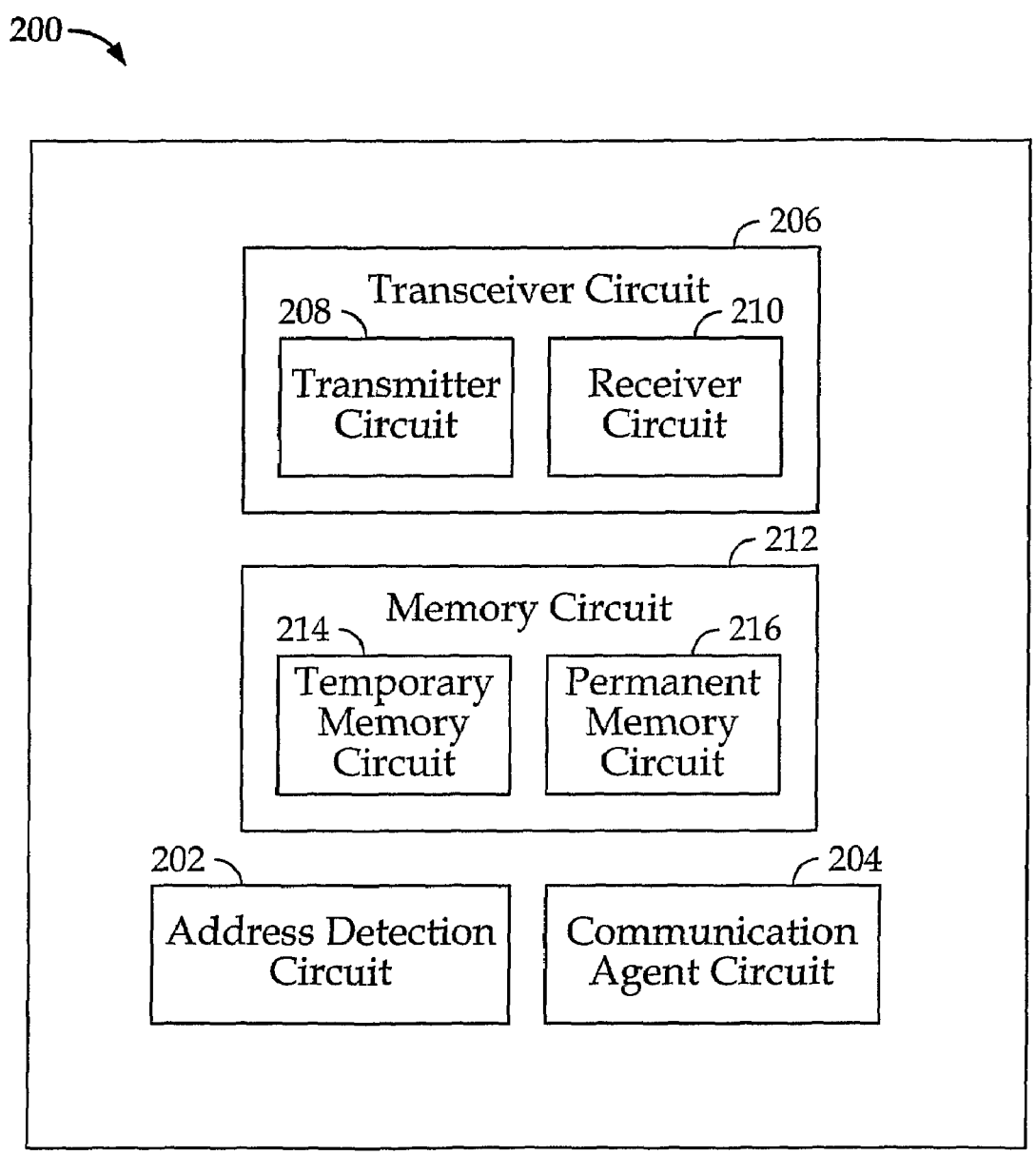
FIG. 2 comprises an overview of a mobility agent according to various embodiments of the invention.

Referring to FIG. 2, a mobility agent according to various embodiments of the invention is shown and indicated generally at 200. These various teachings contemplate either adapting any of the components in the communication system to fully or partially implement the various embodiments described. As a result, the present mobility agent is given as one of many configurations and circuitry topologies available, and these various alternative embodiments, although not shown, are readily appreciated by one skilled in the art. Thus, they are within the scope of the various teachings described. Furthermore, the mobility agent 200 shown is a partial view of the circuit topology of an agent of a mobile node. As such, it should be understood that the various teachings may include other circuit components that are well known in the art that may not be shown. Moreover, circuit refers to any type of executable instructions that can be implemented as hardware, firmware, and/or software, which are all within the scope of the various teachings described.

In this exemplary mobility agent 200 shown, the sender node 104 is linked to this mobility agent and an address detection circuit 202 is included for detecting the address of the forwarding agent 114 linked to the receiver node 112 to provide a discovered address. A communication agent circuit 204 is then used to establish a direct route with the forwarding agent 114 using the discovered address for subsequent communications between the sender node 104 and the receiver node. According to an embodiment, prior to establishing the direct route, the communication agent circuit 204 confirms that the forwarding agent is able to communicate on the direct route. Specifically, in one embodiment, the communication agent circuit 204 sends a confirmation request to the forwarding agent, wherein confirmation is established when the forwarding agent responds to the confirmation request, which can be a response to the confirmation message or data for the receiver node. The communication agent circuit 204 also, according to one embodiment, determines whether the direct route should be terminated based on a predefined condition that may be invoked by a disconnection of either the sender or receiver node. If the direct route should be terminated, the communication agent circuit 204 accordingly terminates the direct route, which may include an exchange of a termination notice for notifying the termination of the direct route.

According to one embodiment, the address detection circuit 202 sends a discovery packet having a route tracking option to the receiver node. Specifically, in one embodiment, the discovery packet is an Internet Control Message Protocol ("ICMP") Echo packet having an Internet Protocol ("IP") record route option using an address of the sender node as a source address and an address of the receiver node as a destination address. In this case, the address detection circuit detects the Internet Protocol address of an IP address of the forwarding agent from an ICMP Echo Reply packet having a plurality of addresses tracked by the Internet Protocol record route option. As typically done, communication from the mobility agent 200 to other nodes is effectuated via a transceiver circuit 206, which also includes a transmitter circuit 208 and a receiver circuit 210 for transmitting and receiving data that may be stored in a memory circuit 212. The memory circuit 212 includes a temporary memory circuit 214 and a permanent memory circuit 216.

Figure 3:
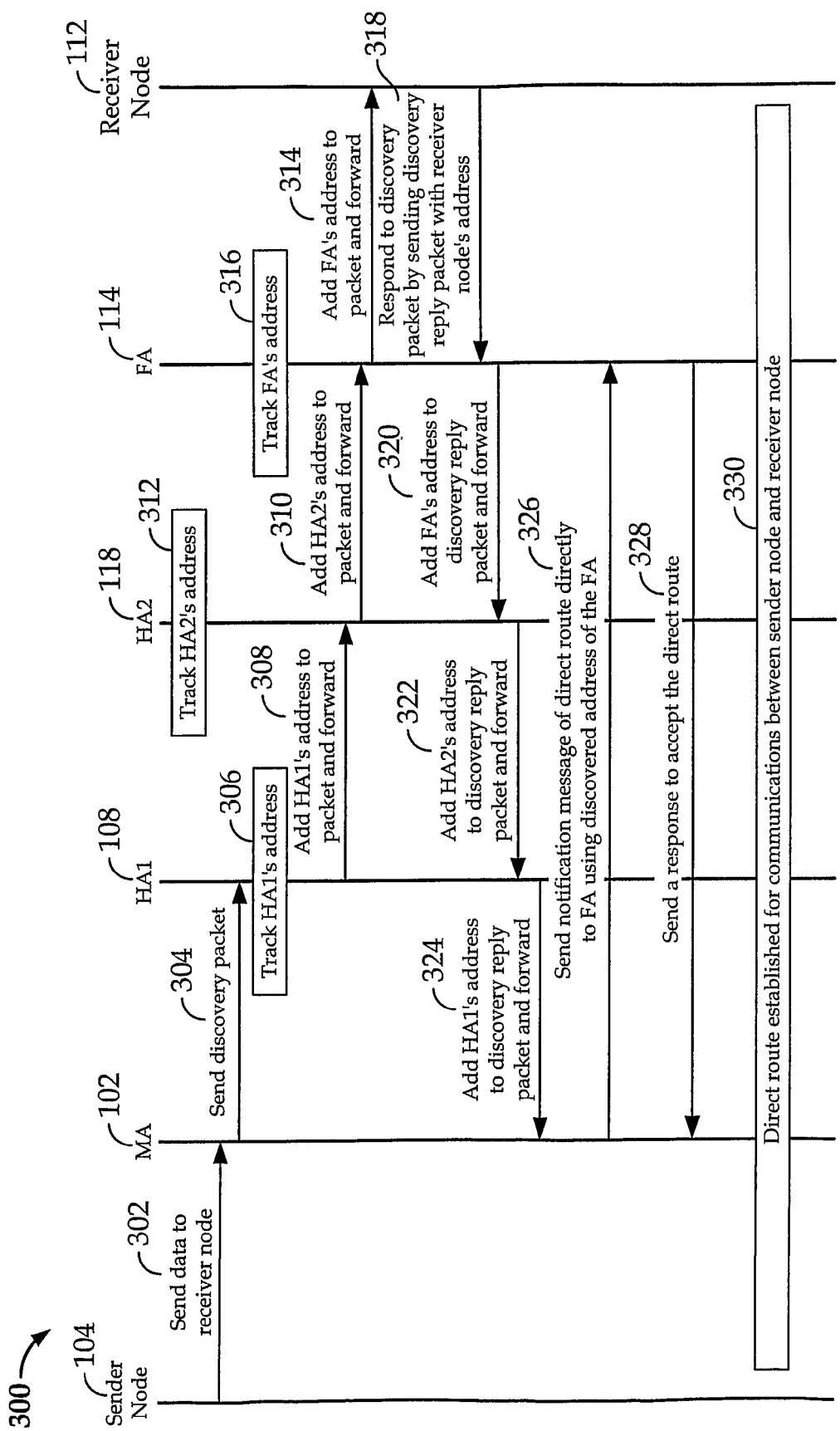
FIG. 3 comprises an exemplary call flow diagram between a sender node and a receiver according to various embodiments of the invention.

Turning now to FIG. 3, an exemplary call flow diagram between a sender node and a receiver node according to various embodiments of the invention is shown and indicated generally at 300. The call flow diagram shows a call flow between the sender node 104 and the receiver node 112, but the various teachings are not limited to this exemplary call flow diagram shown. The mobility agent 102 of the sender node 104 can be invoked by any number of actions, and not just necessarily by the user of the sender node requesting to send data to the receiver node. For example, the mobility agent 102 can be triggered by other logic flow and/or processes from any of the components shown in system 100.

In this specific call flow 300 shown, the sender node 104 is sending 302 data to the receiver node 112. In order to communicate with the receiver node 112, the sender node 112 specifically sends data 302 to the mobility agent 102 for forwarding. In an attempt to discover a direct route to the receiver node, the mobility agent 102 sends 304 a discovery packet with a destination address of the receiver node. In this specific call flow, for tracking 306 the home agent one's address, the discovery packet is sent to the home agent one 108 (using, for example, reverse tunneling). The home agent one 108 then adds its own address to the discovery packet and forwards 308 the discovery packet to home agent two 118. Similarly, the home agent two 118 does the same thing by adding its address to the discovery packet and forwarding 310 the packet to the forwarding agent 114 linked to the receiver node 112. With this addition to the discovery packet, the home agent two's address is tracked 312.

The forwarding agent 114, in response to the discovery packet from the home agent two 118, similarly adds its own address to the discovery packet and forwards 314 the packet to the receiver node. Again, the adding of the forwarding agent's address results in the forwarding agent's address being tracked 316 by the mobility agent 102. Responsive to the discovery packet, the receiver node sends 318 a discovery reply packet with the address of the receiver node. The discovery packet can be used to tunnel the addition of the receiver node's address, which generates the discovery reply packet. In other words, the discovery reply packet can be the same as the discovery packet, except that the address of the receiver node has now been added. Once the discovery reply packet is received, the forwarding agent adds its own address again to indicate the route and forwards 320 it to the home agent two 118, which in turn does the same thing and forwards 322 the discovery reply packet to the home agent one 108. Similarly, in response to the discovery reply packet, the home agent one 108 adds its own address and forwards 324 the packet to the mobility agent 102.

Because each address on the route is being added to the packet, the route of the communication between the sender node 102 and the receiver node 112 is tracked. In other words, the mobility agent 102 can obtain the address of the forwarding agent from the discovery reply packet. According to one embodiment, the mobility agent picks the address that preceded and followed the receiver node's address, which indicates that this address is most likely the forwarding agent that is substantially directly linked to the receiver node. Once this address of the forwarding agent is obtained, the mobility agent sends 326 a notification message of using the direct route directly to the forwarding agent in order to confirm that the forwarding agent is able to communicate on the direct route. And if the forwarding agent can in fact communicate on the direct route, a response is sent 328 from the forwarding agent as a confirmation. This confirmation establishes 330 that the direct route between the forwarding agent and the mobility agent is used for subsequent communications between the sender node and the receiver node for exchanging data.

Figure 4:
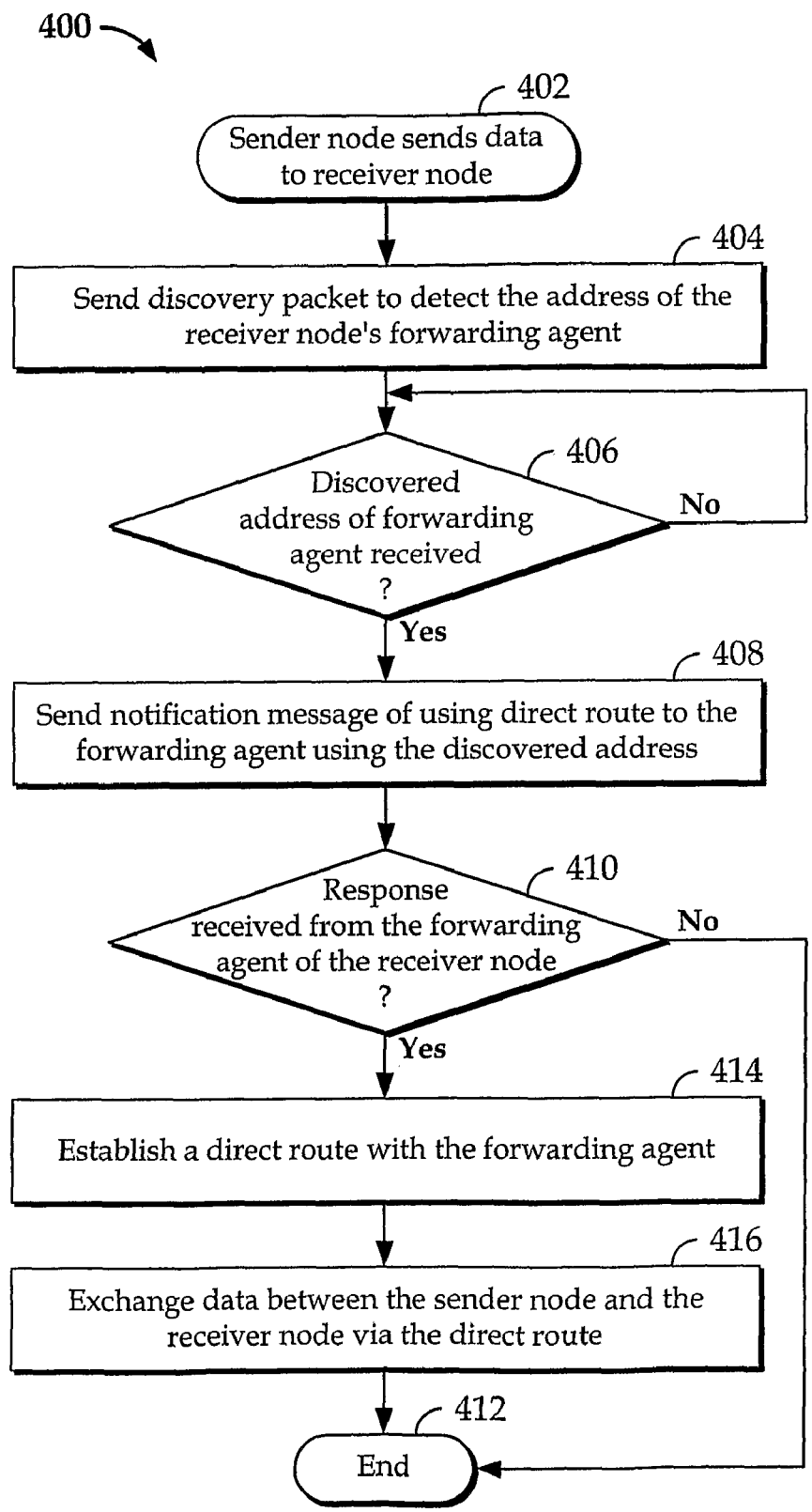
FIG. 4 comprises a flow chart diagram of a setup process according to various embodiments of the invention.

Turning now to FIG. 4, a flow chart diagram of a setup process according to various embodiments is shown and indicated generally at 400. Although the process shown is preferably implemented at the mobility agent 102, there may be other implementations of each of the processes shown that are better suited for other components in the communication system depending upon the configuration of the system. Thus, these processes shown can be implemented fully or partially at any of the components within the system. Moreover, as one skilled in the art can readily appreciate, any of the processes shown can be altered in multiple ways to achieve the same functions and results of the various teachings described. As a result, these processes represent one exemplary embodiment of multiple variation embodiments that may not be specifically shown. Thus, the processes shown are directed to the system, and each of them may be altered slightly to accommodate any of the components in the communications system. These other embodiments, however, are within the scope of the various teachings described.

This particular setup process is initiated 402 with the sender node sending data to the receiver node. Although the sender node, as shown, initiates the process, other triggering actions are contemplated. For example, the implementation can be configured to include any appropriate logics or actions from any one of the components shown in system 100. The specificity of trigger actions of the set up process would depend upon the configuration of the system, which is readily appreciated by a skilled artisan.

Upon initiation, the setup process sends 404 a discovery packet for detection of the address of the receiver node's forwarding agent to provide a discovered address. It is next determined 406 whether such a discovered address of the forwarding agent has been in fact received, and if not, the process keeps checking for the receipt of the discovered address of the forwarding agent. If, on the other hand, the discovered address of the forwarding agent has been received, a notification message using the direct route is sent 408 to the forwarding agent using the discovered address. The purpose of the notification message is for the mobility agent to confirm that the forwarding agent can in fact communicate on the direct route. Other embodiments of the confirmation are, however, contemplated, and thus they are within the scope of the various teachings provided. For this particular embodiment, it is next determined 410 whether a response has been received from the forwarding agent, and if not, the process ends 412 at this point. Otherwise, the response can be a response that specifically confirms the use of the direct route and/or the response can include data for the receiver node as an indication that the forwarding agent is communicating on the direct route. Once a response has been received from the forwarding agent, which indicates a confirmation of the forwarding agent's ability to communicate on the direct route, the process accordingly establishes 414 the direct route with the forwarding agent. Any subsequent data communications between the sender node and the receiver node are, thus, exchanged 416 via the direct route. The process 412 ends at this point.

Figure 5:
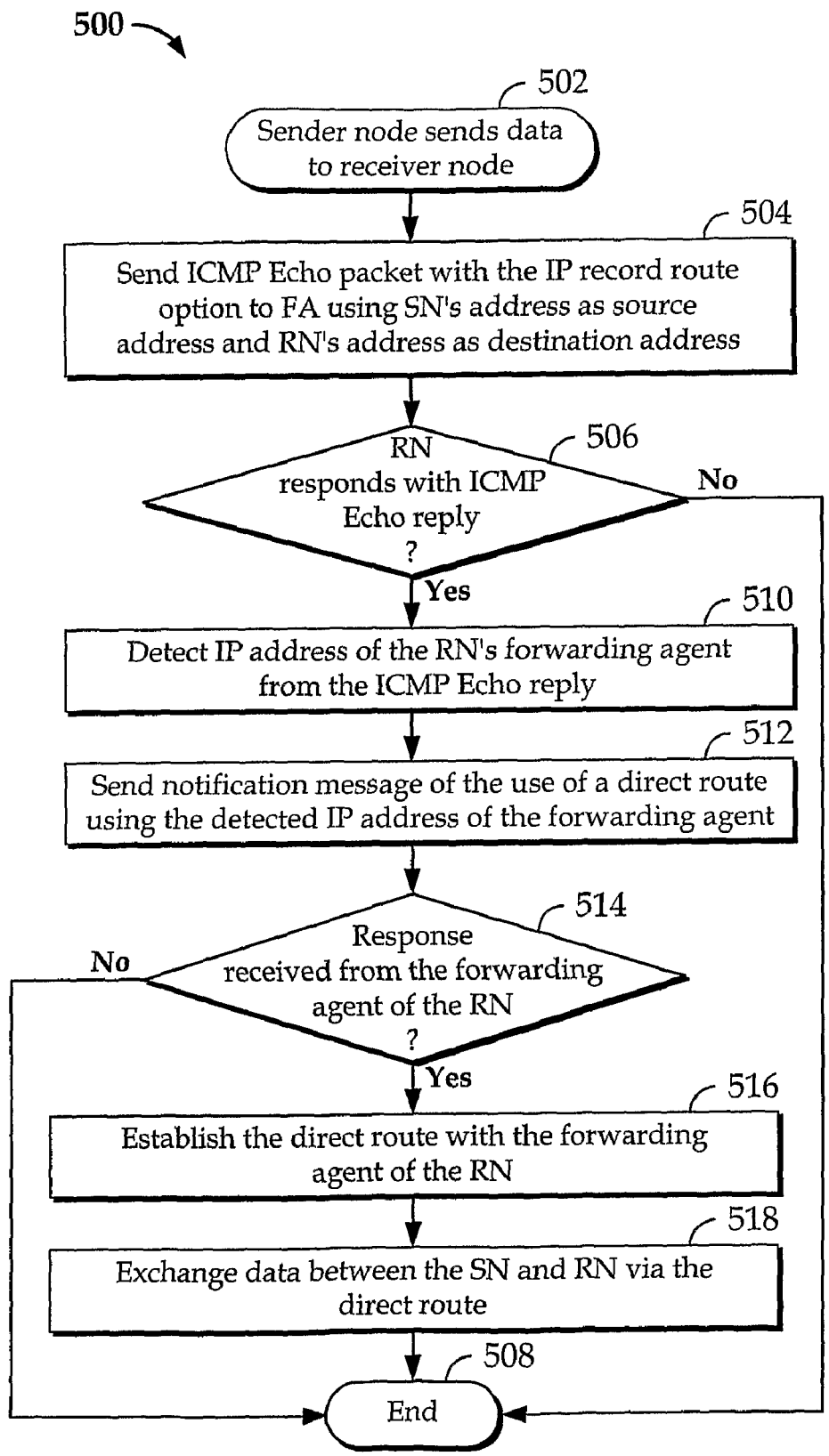
FIG. 5 comprises a flow chart diagram of a setup process according to one embodiment of the invention.

Turning now to FIG. 5, a flow chart diagram of a setup process according to one embodiment is shown and indicated generally at 500. This process, as shown, starts 502 with the sender node sending data to the receiver node. In this embodiment, an ICMP Echo packet with the IP Record Route option is used as the discovery packet, which is sent 504 to the forwarding agent. Specifically, in this embodiment, the ICMP Echo packet uses the sender node's address as a source address and the receiver node's address as the destination address. The process then determines 506 whether the receiver node responded with an ICMP Echo Reply packet, which contains a plurality of addresses added during the route. If not, the process ends 508 at this point. If, however, an ICMP Echo Reply packet was received, the process detects 510 the address of the forwarding agent linked to the receiver node using the ICMP Echo Reply packet, specifically to provide a discovered address of the forwarding agent.

A notification message of the use of a direct route is then sent 512 directly to the forwarding agent using the discovered address of the forwarding agent. The process then determines 514 whether a reply to the confirmation message has been received from the forwarding agent of the receiver node, and if not the process ends 508 at this point. Otherwise, once a reply has been received from the forwarding agent indicating that the direct route can be used, the process accordingly establishes 516 the direct route with the forwarding agent of the receiver node. Data between the sender node and the receiver node is properly exchanged 518 using the established direct route, and the setup process comes 508 to an end.

Figure 6:
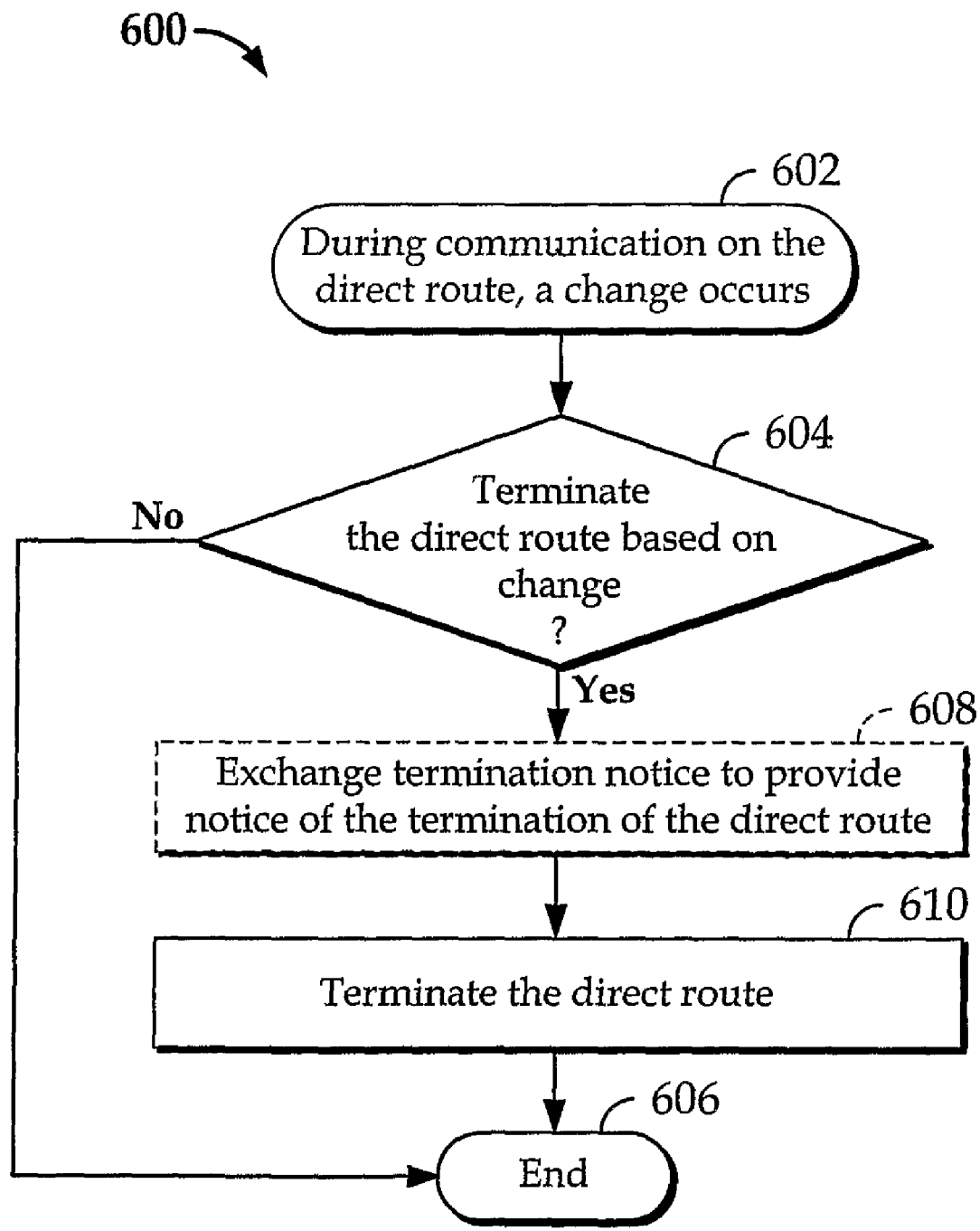
FIG. 6 comprises a flow chart diagram of a termination process according to one embodiment of the invention.

Referring now to FIG. 6, a flow chart diagram of a termination process according to one embodiment is shown and indicated generally at 600. Once the direct route for the sender node and the receiver node has been established and data communication is being exchanged on the direct route, a termination may be invoked either by a request from the nodes and/or a disconnection from the network. Thus, the termination process 600 is included to track these changes that may affect the direct route. In this embodiment, the termination process 600 is initiated 602 with a change that occurs during communications on the direct route. It is next determined 604 whether the direct route should be terminated based on the change, and if not, the termination process 600 ends 606 at this point.

If, on the other hand, the change does require a termination of the direct route, a termination notice is exchanged 608 for providing notice of the termination of the direct route. Specifically, a set of predefined conditions that includes a disconnection of the sender or receiver node causes the direct route to be terminated in one embodiment. In this case, if the receiver node disconnects, the forwarding agent sends the termination notice to the mobility agent, whereas if the sender node disconnects, the mobility agent sends the termination notices to the forwarding agent. As a result, an exchange of termination notice is presented, which is an optional feature. Once the need to terminate the direct route has been established, the direct route is accordingly terminated 610 and the process is completed 606.

With these various teachings shown, a communication technique is provided that establishes a direct route with agents that are substantially directly linked to the nodes exchanging communications. As a result, a shorter route between the nodes is used, resulting in a more optimized communication route in the system. Specifically, because the home agents of the nodes are dropped from the route, less forwarding is needed to exchange data between the nodes. Thus, fewer network resources are used to create a more efficient system, while providing a shorter end-to-end delay between the nodes.

Moreover, since the route is optimized at the agent that is substantially directly linked to the mobile node and not its home agent, keeping track of various mobile-to-mobile connections is now simpler than before. Thus, a more efficient load distribution is provided, among other things. Moreover, the various embodiments provided can be easily implemented into the existing system without necessarily changing the home agent and mobile nodes. Thus, the various teachings presented can be seamlessly integrated into the existing system with minimal cost. Furthermore, the various embodiments work even if the agent directly connected to either the sender or receiver node autonomously manages the setup and update of the path to the mobile node's home agent without any explicit request (such as a Mobile Internet Protocol registration request) from the mobile node. In fact, various teachings provided can be used even when the mobile nodes are not mobile-Internet Protocol capable.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

We claim:

1. A method comprising:
   detecting an address of a forwarding agent linked to a receiver node to provide a discovered address, wherein detecting comprises sending a discovery packet to the receiver node; and
   sending a notification message to the forwarding agent to indicate the use of a direct route with the forwarding agent;
   determining whether a response has been received directly from the forwarding agent; and
   when a response has been received directly from the forwarding agent, establishing the direct route with the forwarding agent of the receiver node using the discovered address for subsequent communications between a sender node and the receiver node.

2. The method according to claim 1 further comprising:
   determining whether communication with the forwarding agent should be terminated based on a predefined condition;
   terminating the direct route with the forwarding agent when communication with the forwarding agent should be terminated based on the predefined condition.

3. The method according to claim 1, wherein the discovery packet is an Internet Control Message Protocol Echo packet having an Internet Protocol record route option using an address of the sender node as a source address and an address of the receiver node as a destination address and wherein the method further comprises detecting an Internet Protocol address of the forwarding agent from an Internet Control Message Protocol Echo Reply packet having a plurality of addresses tracked by the Internet Protocol record route option.

4. The method according to claim 1, wherein the discovery packet comprises a route tracking option.

5. An apparatus comprising:
   an address detection circuit that detects an address of a forwarding agent linked to a receiver node to provide a discovered address, wherein detecting comprises sending, to the receiver node, a discovery packet; and
   a communication agent circuit that establishes a direct route with the forwarding agent of the receiver node using the discovered address for subsequent communications between the sender node and receiver node; and
   wherein the discovery packet is an Internet Control Message Protocol Echo packet having an Internet Protocol record route option using an address of the sender node as a source address and an address of the receiver node as a destination address and wherein the address detection circuit detects an Internet Protocol address of the forwarding agent from an Internet Control Message Protocol Echo Reply packet having a plurality of addresses tracked by the Internet Protocol record route option.

6. The apparatus as defined in claim 5, wherein the communication agent circuit further determines whether the direct route should be terminated based on a predefined condition and terminates the direct route when the direct route should be terminated based on the predefined condition.

7. The apparatus as defined in claim 5, wherein the communication agent circuit further confirms that the forwarding agent of the receiver node is able to communicate on the direct route.

8. The apparatus as defined in claim 5, wherein the discovery packet comprises a route tracking option.

9. A system comprising:
   a plurality of nodes capable of wireless communication;
   a first mobility agent linked to a sender node from the plurality of nodes requesting communication with a receiver node from the plurality of nodes, wherein the mobility agent forwards data packets for the sender node;
   a first home agent associated with the sender node and linked to the first mobility agent;
   a second home agent associated with the receiver node;
   a second mobility agent linked to the second home agent and to receiver node, wherein the second mobility agent forwards data packets for the receiver node; and
   wherein the sender node conveys a first packet to the receiver node via the first mobility agent, the first home agent, the second home agent, and the second mobility agent, wherein the first mobility agent, based on a response to the conveyance of the first packet, detects an address of the second mobility agent to provide a discovered address and establishes a direct route with the second mobility agent using the discovered address, and the sender node conveys a second packet to the receiver node, via the mobility agent and the forwarding agent and using the direct route, bypassing the first home agent and the second home agent.

10. The system according to claim 9, wherein the discovery packet is an Internet Control Message Protocol Echo packet having an Internet Protocol record route option using an address of the sender node as a source address and an address of the receiver node as a destination address, and wherein detecting further comprises detecting an Internet Protocol address of the forwarding agent from an Internet Control Message Protocol Echo Reply packet having a plurality of addresses tracked by the Internet Protocol record route option.

11. The system according to claim 9, wherein the first mobility agent detects the address of the second mobility agent by sending, to the receiver node, a discovery packet.

12. The system according to claim 11, wherein the discovery packet comprises a route tracking option.

* * * * *